United States Patent [19]

Exner et al.

[11] 4,175,453
[45] Nov. 27, 1979

[54] DEVICE FOR TENSIONING SEVERAL SCREW BOLTS

[75] Inventors: Gerhard Exner; Volfango Festinori, both of Berlin, Fed. Rep. of Germany

[73] Assignee: Kraftwerk Union Aktiengesellschaft, Mülheim, Fed. Rep. of Germany

[21] Appl. No.: 890,920

[22] Filed: Mar. 28, 1978

[30] Foreign Application Priority Data

Apr. 22, 1977 [DE] Fed. Rep. of Germany ....... 2718602

[51] Int. Cl.² .............................................. E21B 19/00
[52] U.S. Cl. ................................. 81/57.38; 254/29 A
[58] Field of Search .................... 254/29 A; 81/57.38; 29/452

[56] References Cited

U.S. PATENT DOCUMENTS

| 3,844,533 | 10/1974 | Markiewicz et al. ............ 254/29 A |
| 3,847,041 | 11/1974 | Meschonat et al. .............. 81/57.38 |

FOREIGN PATENT DOCUMENTS 884923 12/1961 United Kingdom .................. 254/29 A

*Primary Examiner*—Robert C. Watson
*Attorney, Agent, or Firm*—Kenyon & Kenyon

[57] ABSTRACT

A device for tensioning a screw bolt wherein the device comprises a lifting cylinder having a piston and arranged on a support ring and means responsive to the piston for engaging the screw bolt in a positive locking manner including: a first member engaged by the piston; a second member hinged to the first member; and guide surfaces for pressing the second member against an engagement surface of the screw bolt in a positive engaging and self-locking manner.

4 Claims, 2 Drawing Figures

DEVICE FOR TENSIONING SEVERAL SCREW BOLTS

BACKGROUND OF THE INVENTION

1. Field of the Invention

The invention relates to a device for tensioning a nut and screw bolt combination, particularly such a combination arranged on a pitch circle, wherein the tensioning device includes a support ring having recesses for receiving the nut together with the screw bolt, a separate turning unit fastened to the ring for rotating the nut, a lifting cylinder having a piston and arranged at the support ring and means responsive to the piston for engaging the screw bolt in a positively locking manner.

2. Description of the Prior Art

Such a tensioning device is used, for example, for closing or opening the head covers of reactor vessels, and is disclosed in the German Offenlegungsschrift No. 24 28 847. In this known device, the screw bolt is tensioned by lifting cylinders located at the support ring. When pressure is admitted to these cylinders they stretch the screw bolt via pressure bridges and coupler jaws which are inserted into corresponding engagement surfaces at the screw bolt in a form-locking manner. In the tensioned condition the nut of the screw bolt is turned all the way to its end position, so as to retain the tension placed on the screw bolt. During tensioning, however, the form-locking engagement of the coupler jaws with the screw bolt necessitates an external force which must be maintained as a counter force during the entire tensioning process. Moreover, this force must be controlled so that no unilateral load is set up which could result in uncontrolled distortion of and damage to the screw bolt. The generation of such controlled counterforce thus requires a highly complicated structure.

A further type of automatic screw tensioning device is also disclosed in the German Offenlegungsschrift No. 22 58 859. In this type of device, the pistons of the lifting cylinders act on the screw bolt via a tensioning nut and a separate turning unit serving as the drive is provided for the tensioning nut as well as for the nut of the screw bolt. While this arrangement thus permits the screw bolt to be loosened, tensioned or released fully automatically, the dual drive required for each screw bolt is very expensive making the overall device costly. It is, therefore, an object of the present invention to provide a tensioning device of the above type which does not necessitate the use of a separate drive for the tensioning nut nor the use of a counterforce.

SUMMARY OF THE INVENTION

In accordance with the principles of the present invention, the above and other objectives are achieved in a tensioning device of the above type by forming the screw bolt engaging means so as to include: a first member which is engaged by the lifting cylinder piston; a plurality of second members hinged to the first member; and guide surfaces for causing the second members to press against an engagement surface of the screw bolt in a positively engaging and self-locking manner when a pressure force is exerted against the piston.

Thus, with the tensioning device of the present invention, the second members which engage the screw bolt in a positively-locking manner are hinged and their movements are controlled by guide surfaces in such a manner that pressure at the engagement surface of the screw bolt as well as transmission of the tension force required for the tensioning of the screw bolt are simultaneously realized by application of a pressure force to the cylinder piston. Since this occurs automatically, the second members are likewise disengaged and the positively locked connection is released if this pressure force ceases. The second members, therefore, do not impede the installation of the screw tensioning device nor the repeated change in position of the device, which is sometimes necessary.

Advantageously, the second members of the present invention can be in the form of a clamping jaw comprising several parts and the movement of which is controlled via template slots therein. Alternatively, the second members can also take the form of movably fastened cone segments which spread apart due to their own weight.

BRIEF DESCRIPTION OF THE DRAWING

The above and other features and aspects of the present invention will become apparent upon reading the following detailed description in conjunction with the accompanying drawings in which.

DETAILED DESCRIPTION

Figure 1:
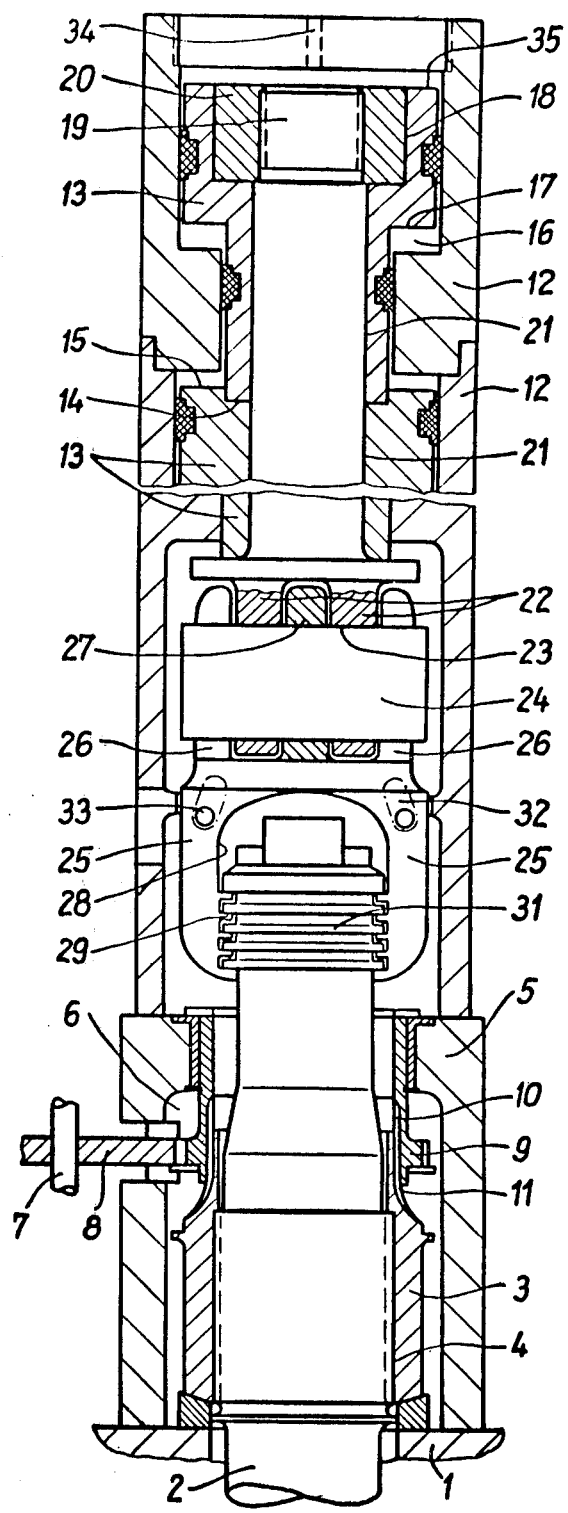
FIGS. 1 and 2 illustrate first and second screw tensioning devices in accordance with the principles of the present invention.

FIG. 1 shows a screw bolt 2 and nut 3 combination arranged on a pitch circle and used to open and close a cover 1 of a pressure vessel such as, for example, a reactor vessel. The nut 3 comprises a steel cylinder having internal thread which engages and can be turned up and down on the thread 4 of the screw bolt 2 via a further device. The latter device also serves to tension the screw bolt 2 in order to impart to it a pretension so that the cover 1 is pressed against the corresponding contact surface of the pressure vessel.

More particularly, the aforesaid device comprises a support ring 5 having recesses 6 for receiving the respective screw bolt 2 and the nut 3. Attached to the outside of support ring 5 is a turning or rotating unit for turning the nut 3. The turning unit includes a ring 9 supported on the ring 5 and having internal gearing 10 which engages the external gearing 11 of the nut 3. The ring 9 is driven by a pinion 8 which is mounted on a shaft 7 and projects into the recess 6. As can be appreciated the interposition of the ring 9 between the nut 3 and the pinion 8 results in the torque of the pinion being transmitted uniformly to the nut.

The device is further provided with means for tensioning the screw bolt 2 which comprises several lifting cylinders 12 which are mounted one on top of the other in column fashion on the ring 5. Slidably arranged within the cylinders 12 are pistons 13. Each upper one of the pistons 13 always sits with its underside 14 on the upper side 15 of an immediately preceding lower piston. Thus, when pressure medium is fed into the interior 16 of the lifting cylinders 12 via lines, not shown, the pistons 13 are all displaced upward. The use of several pistons 13 has the advantage that the force generated by the pressure medium is multiplied, as the effective areas 17 of the pistons 13 acted upon by the medium are also multiplied accordingly.

The uppermost one of the pistons 13 is provided with a recess 18 in which is seated a nut 20 whose internal threads hold the upper end of a tie rod 19. The tie rod 19 extends downward through the respective bore holes 12 in the pistons 13 and terminates in two eye portions 22 having holes 23 for receiving a horizontally disposed pivot pin 24. The pivot pin 24 connects the tie rod 18 to a two-part clamping jaw 25, one of whose parts includes an outer eye portion 26 and the other of whose parts includes a middle eye portion 27 for receiving the pin. The clamping jaw 25 is further provided on its inner clamping surfaces 28 with projections or spaced teeth 29 which can engage with corresponding grooves and projections provided on the engagement surface 31 of the screw bolt 2 in a form-locking manner.

The movement of the clamping jaws 25 is controlled by respective template slots 32 therein. The latter slots, in turn, engage and ride on counterpins 33 which are fixed to the support ring 5. The shape and position of the template slots 32 are chosen so that with a tension force applied to the tie rod 19, thereby moving it upward the projections 29 of the clamping jaws 25 are brought exactly into form-locking connection with the engagement surface 31 of the screw bolt 2. Furthermore, the shape and position of the slots is such that when a pressure force is applied to the tie rod, thereby moving it downward, the clamping jaws 25 spread apart and, therefore, are disengaged from the engagement surface 32 of the screw bolt 2, whereby the positively locking connection between the clamping jaws 25 and the screw bolts 2 is released.

In this manner, the downward pressure force applied to the pistons 13 is transmitted to the screw bolt 2 via the tie rod 19 connected to the uppermost pistion 13 and the clamping jaws 25. The upward tension force on the other hand, is applied to the screw bolt via the tie rod 19 the pivot pin 24 and the clamping jaws 25, whose clamping forces act on the bolt as tension forces. When applying tension to the screw bolt 2, the clamping jaws 25 are initially in their lowest position, having been brought there by admitting oil or air pressure through a hole 34 in the upper surface 35 of the uppermost piston 13. Thereupon upward pressure is applied to the pistons 13, thereby causing the tie rod 19 to pull the clamping jaws 25 upward. The projections 29 of the clamping jaws 25 then engage the corresponding grooves of the engagement surface 31 at the screw bolt 2 and with continued application of upward pressure to the pistons 13, the screw bolt 2 is tensioned. Advantageously, therefore, with the present arrangement, the tighter the clamping jaws 25 clamp the screw bolt the greater is the amount of tension applied to the screw bolt. When the desired pretension of the screw bolt 2 is reached, the nut 3 is then brought into its end position by means of the aforementioned drive unit, so that bolt 2 remains pretensioned. This completes the tensioning process and oil or air pressure is then again applied to the upper surface 35 of the uppermost pistion 13, thereby moving the clamping jaws 25 downward the causing them to disengage from the engagement surface 31 of the screw bolt 2.

Figure 2:
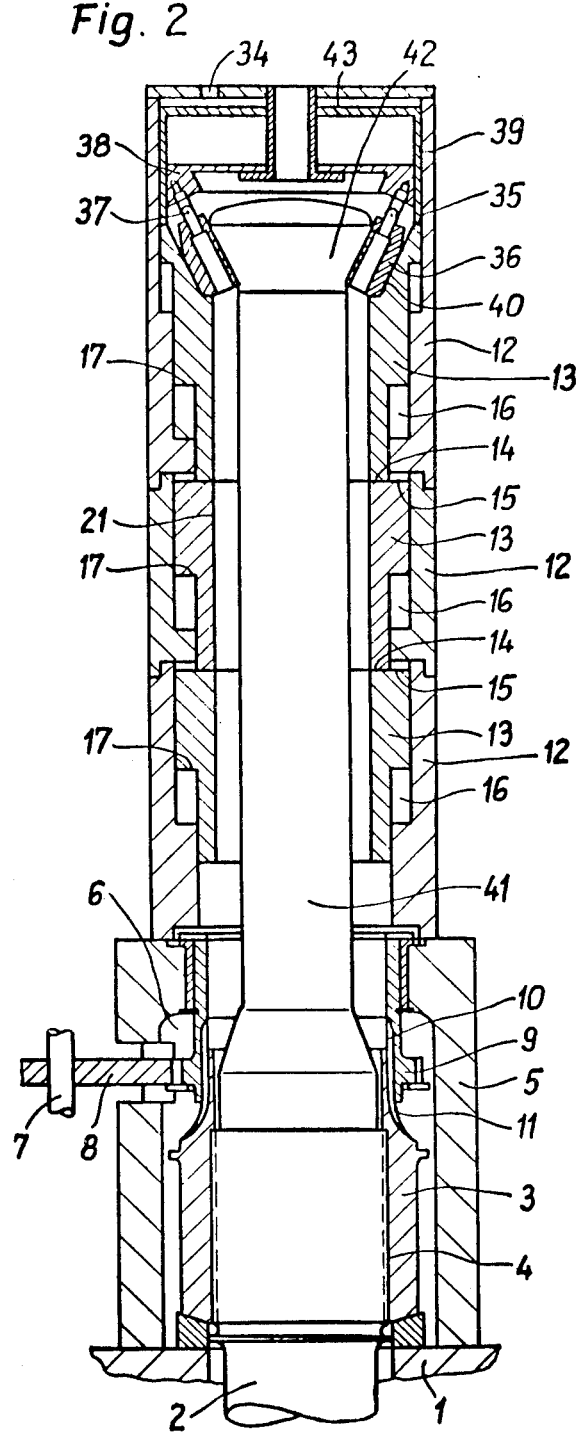

FIG. 2 shows an embodiment of the present invention wherein the same reference symbols have been used to identify parts similar to those shown in FIG. 1. In FIG. 2, instead of clamping jaws 25, cone segments 36 are employed to transmit the upward pressure force of the pistons 13 to the screw bolt 2, thereby tensioning same. More specifically, cone segments 36, of which at least three are provided, are movably fastened via hinges 37 to a ring 38 which is slidably arranged inside a return piston 39. The return piston 39, in turn, is disposed on the top surface 35 of the uppermost piston 13. The uppermost piston 13 is further formed with a conical upper surface 40, which serves as a guide surface for the cone segments 36. In addition, the screw bolt 2 is formed with an upper extension 41 which extends through the holes or bores 21 of the pistons 13 and ends at its upper end as a cone 42 whose surfaces parallel those of the conical surfaces 40.

As with the previous arrangement, before a tensioning force is applied to the screw bolt 2, the pistons 13 are in their lowest position. In this position of the pistons, the cone segments 36 are spread apart due to their own weight and slide past the sides of the cone 42 of the extension 41 without difficulty. To tension the screw bolt 2, a pressure medium is introduced into the interior 16 of the lifting cylinders 12 via lines, not shown, and the pistons are displaced upwardly. Such upward movement, causes the conical surface 40 of the uppermost piston to engage and press the cone segments 36 against the conical surface of the cone 42. Thus, a positively engaging, self-locking connection occurs between the piston 13, the cone segments 36 and the screw bolt 2. Further upward movement of the pistons 12 will then cause tensioning of the screw bolt 2 via the extension. After the desired amount of pretension of the screw bolt 2 is reached, the nut 3, as before, is rotated until it is brought into its end position. Thereafter air or oil is admitted via the hole 34 to the upper surface 43 of the return piston 39, until the pistons 13 are again in their lowest position. The cone segments 36 then become freely movable and fold apart, releasing the extension 41 and premitting removal of the screw tensioning apparatus.

What is claimed is:

1. In a device for tensioning a screw bolt of a nut and screw bolt combination, the device comprising: a support ring having recesses for receiving said screw bolt and nut; a turning unit fastened to said ring for rotating said nut; a lifting cylinder arranged on said support ring and having a piston, the improvement comprising means coupled to the piston for engaging the screw bolt in a positive locking manner in response to only a tensioning movement of the piston, said means including:
   (a) a first member connected to the piston for movement therewith in the direction of tensioning;
   (b) a second member hinged to said first member;
   (c) an extending portion of said screw bolt having thereon an engagement surface; and
   (d) guide surfaces for pressing said second member against said engagement surface of said screw bolt in a positively-engaging and self-locking manner.

2. In a device in accordance with claim 1, the improvement wherein:
   said second member comprises a clamping jaw having projections;
   said engagement surface comprises corresponding projections on said extending portion; and
   said guide surfaces comprise template slots associated with said clamping jaw.

3. In a device in accordance with claim 2, the improvement wherein:
   said first member includes a tie rod;
   and said device further includes a pivot pin connecting said clamping jaw to said tie rod.

4. In a device in accordance with claim 1, the improvement wherein
   said first member comprises a return piston disposed upon said piston and a ring movably arranged in said return piston;
   said second member includes at least three conic segments hinged to said ring;
   and said guidance surfaces are formed by surfaces at the upper end of said piston.

* * * * *